(12) United States Patent
Bhargava et al.

(10) Patent No.: US 10,875,963 B2
(45) Date of Patent: Dec. 29, 2020

(54) POWDER COMPOSITIONS FOR LASER SINTERING

(71) Applicant: Shakespeare Company LLC, Boca Raton, FL (US)

(72) Inventors: Saumitra Bhargava, Clarksville, MD (US); Alfred Oren Jessee, Lugoff, SC (US); Yuhong Wu, Columbia, SC (US)

(73) Assignee: SHAKESPEARE COMPANY LLC, Boca Raton, FL (US)

( * ) Notice: Subject to any disclaimer, the term of this patent is extended or adjusted under 35 U.S.C. 154(b) by 0 days.

(21) Appl. No.: 15/542,276

(22) PCT Filed: Jan. 8, 2016

(86) PCT No.: PCT/US2016/012636
§ 371 (c)(1),
(2) Date: Jul. 7, 2017

(87) PCT Pub. No.: WO2016/112283
PCT Pub. Date: Jul. 14, 2016

(65) Prior Publication Data
US 2017/0369650 A1   Dec. 28, 2017

Related U.S. Application Data

(60) Provisional application No. 62/101,450, filed on Jan. 9, 2015.

(51) Int. Cl.
| | |
|---|---|
| *C08G 69/36* | (2006.01) |
| *B29C 64/153* | (2017.01) |
| *B29C 64/268* | (2017.01) |
| *B33Y 70/00* | (2020.01) |

(Continued)

(52) U.S. Cl.
CPC ............ *C08G 69/36* (2013.01); *B29C 64/153* (2017.08); *B29C 64/268* (2017.08); *B33Y 70/00* (2014.12);

(Continued)

(58) Field of Classification Search
CPC ...... C08G 69/36; C08G 69/265; B33Y 70/00; B29C 64/153; B29C 64/268; C08L 77/06; B29K 2077/00; B29K 2105/0085

(Continued)

(56) References Cited

U.S. PATENT DOCUMENTS

| | | | |
|---|---|---|---|
| 5,750,639 A  *  | 5/1998 | Hayashi ................ | C08G 69/26 528/310 |
| 2003/0158308 A1 * | 8/2003 | Nay ...................... | C08G 69/04 524/239 |

(Continued)

FOREIGN PATENT DOCUMENTS

CN        104191615 A      12/2014

OTHER PUBLICATIONS

Palmer, "Polyamides,Plastics: Additives and Modifications-Stabilizers," Enc. Polym. Sci Tech., John Wiley, pp. 629-630. (Year: 2001).*

(Continued)

*Primary Examiner* — Josephine L Chang
(74) *Attorney, Agent, or Firm* — Eversheds Sutherland (US) LLP

(57) ABSTRACT

Powder compositions for laser sintering. Nylon copolymer compositions are described which provide enhanced performance in processing and finished products when used in 3D laser sintering processes.

11 Claims, 1 Drawing Sheet

(51) Int. Cl.
   *C08G 69/26* (2006.01)
   *C08L 77/06* (2006.01)
   *B29K 77/00* (2006.01)
   *B29K 105/00* (2006.01)

(52) U.S. Cl.
   CPC ............ C08G 69/265 (2013.01); C08L 77/06 (2013.01); *B29K 2077/00* (2013.01); *B29K 2105/0085* (2013.01)

(58) Field of Classification Search
   USPC ........................................................ 524/607
   See application file for complete search history.

(56) References Cited

U.S. PATENT DOCUMENTS

| | | | |
|---|---|---|---|
| 2006/0071359 A1 | 4/2006 | Monsheimer et al. | |
| 2008/0116616 A1* | 5/2008 | Monsheimer | B33Y 70/00 |
| | | | 264/405 |
| 2013/0274435 A1* | 10/2013 | Diekmann | C08G 69/26 |
| | | | 528/335 |
| 2013/0307196 A1 | 11/2013 | Corriol et al. | |

OTHER PUBLICATIONS

McKeen, Table 6.1 "Monomers Used to Make Specific Polyamides/Nylons," Effect of Temperature and Other Factors on Plastics and Elastomers, 2d Ed., Norwich, NY: William Andrew. (Year: 2008).*
International Search Report and Written Opinion for International Application No. PCT/US2016/012636 dated Mar. 16, 2016 (9 pages).
International Preliminary Report on Patentability for International Patent Application No. PCT/US2016/012636 dated Sep. 16, 2016 (10 pages).

* cited by examiner

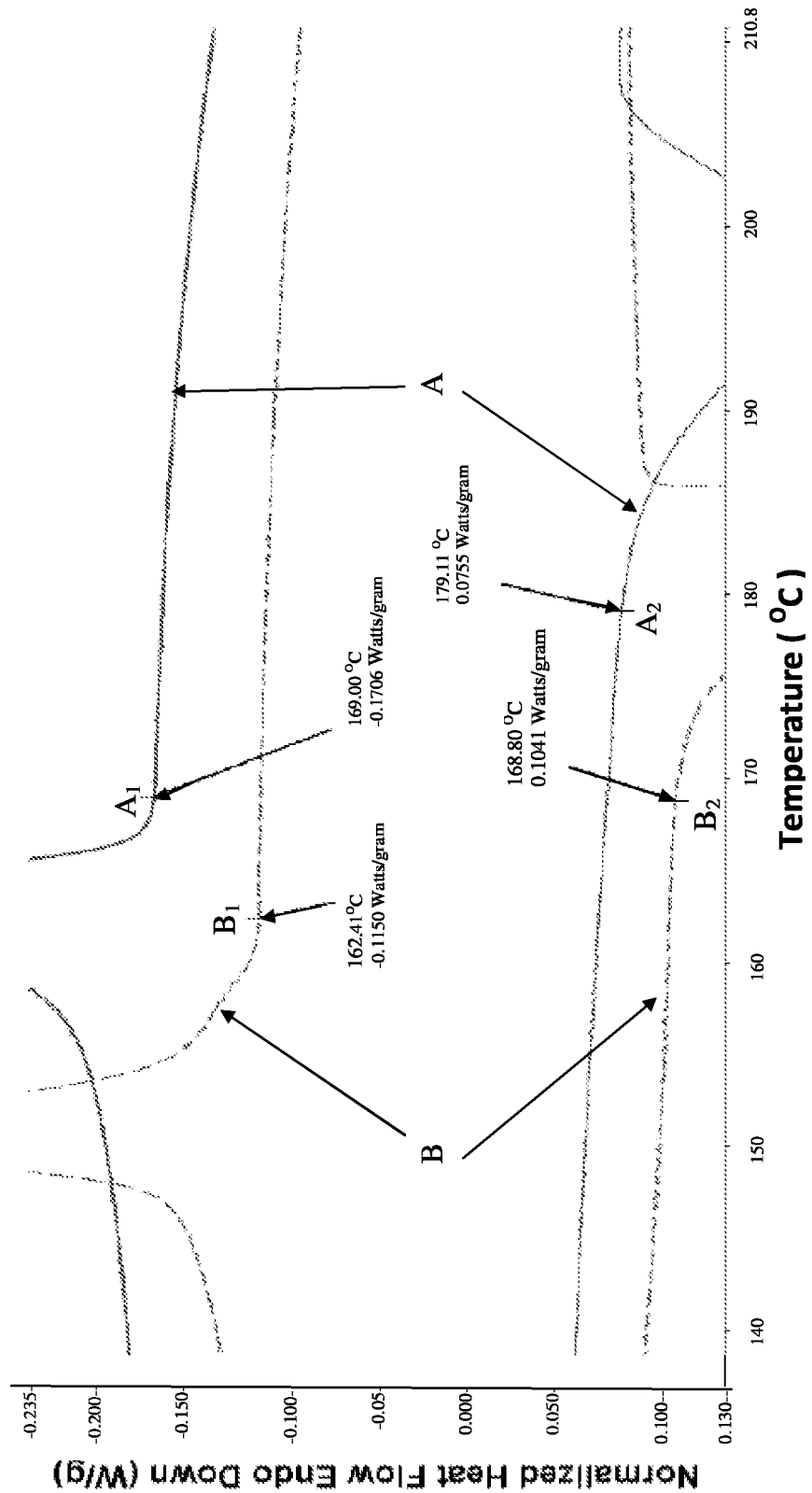

POWDER COMPOSITIONS FOR LASER SINTERING

CROSS-REFERENCE TO RELATED APPLICATION

This patent application claims the benefit of provisional patent application Ser. No. 62/101,450 filed Jan. 9, 2015, in the United States Patent and Trademark Office, the disclosure of which is herein incorporated by reference.

TECHNICAL FIELD

The field of art to which this invention generally pertains is laser sintering, and particularly powder compositions for use in such processes.

BACKGROUND

Laser sintering is a 3D (three dimensional) printing technique which produces high quality functional parts. This technique has been practiced for over two decades, however, only a handful of polymers have a desirable processing window for this technique. Laser sintering is an additive manufacturing or 3D printing method which builds parts layer by layer using a high powered laser to melt and fuse particles, typically of polymers, metals, and glass. Once an end user supplies a digital file with cross-sectional details for the vertical distances, the printer builds a corresponding layer by shining the laser in a selective manner to fuse powder. The layer with fused material typically is made to descend downward and a fresh layer of powder is added on top of it. The process repeats as the laser continues to selectively fuse a new layer of polymer powder followed by depositing successive new layers of fresh powder. Once the entire part is finished, the polymer bed which is made of fused and surrounding unfused powder, is cooled and the sintered parts are removed from the bed of unfused polymer powder.

Multiple academic studies highlight that a polymer with a suitable processing window for laser sintering can be identified with differential scanning calorimeter (DSC). A polymer is deemed suitable when no overlap between the crystallization onset (from cooling curve) and melting onset (from heating curve) is observed when the two calorimetric scans are overlaid on a single graph. This lack of overlap temperature is important as the polymer powder bed is kept at a temperature between the melt temperature and the crystallization temperature to produce best possible surface at fastest possible rate. Most polymers exhibit an overlap in onset of crystallization and melting temperatures and thus cannot be processed by laser sintering.

The embodiments described herein address these challenges.

BRIEF SUMMARY

A polymer powder composition is described which is particularly adapted for use in laser sintering including a nylon copolymer containing at least one aromatic component and at least one aliphatic component.

Additional embodiments include: the polymer powder composition described above where the aliphatic component comprises a $C_4$ to $C_{12}$ diamine reacted with a $C_4$ to $C_{18}$ diacid; the polymer powder composition described above where the aromatic component comprises one or more phthalic acid, diphenic acid, and/or aromatic diamine; the polymer powder composition described above where the phthalic acid comprises isophthalic acid and/or terephthalic acid; the polymer powder composition described above where the aromatic diamine comprises xylenediamine and/or phenylene diamine; the polymer powder composition described above where the aliphatic component is present in an amount of about 75 mole % to about 95 mole % and the aromatic component is present in an amount of about 5 mole % to about 25 mole %; the polymer powder composition described above where the aliphatic component comprises nylon 6, nylon 610 and/or nylon 612; the polymer powder composition described above where the aliphatic component comprises nylon 612 present in an amount of about 75 mole % to about 90 mole %, and the aromatic component comprises isophthalic acid present in an amount of about 0.5 mole % to about 4.5 mole % and terephthalic acid present in an amount of about 9 mole % to about 22 mole %; the polymer powder composition described above where the nylon 612 is present in an amount of about 80 mole %, and the isophthalic acid is present in an amount of about 2 mole % and terephthalic acid present in an amount of about 18 mole %; the polymer powder composition described above where the aliphatic component comprises nylon 610 present in an amount of about 75 mole % to about 90 mole %, and the aromatic component comprises isophthalic acid present in an amount of about 0.5 mole % to about 4.5 mole % and terephthalic acid present in an amount of about 9 mole % to about 22 mole %; the polymer powder composition described above where the nylon 610 is present in an amount of about 80 mole %, and the isophthalic acid is present in an amount of about 2 mole % and terephthalic acid present in an amount of about 18 mole %; the polymer powder composition described above where the aliphatic nylon component comprises nylon 6 present in an amount of about 80 mole % to about 95 mole %, and the aromatic component comprises isophthalic acid present in an amount of about 0.5 mole % to about 4.5 mole % and terephthalic acid present in an amount of about 4 mole % to about 19 mole %; the polymer powder described above where the nylon 6 is present in an amount of about 85 mole %, and the isophthalic acid is present in an amount of about 1.5 mole % and terephthalic acid present in an amount of about 13.5 mole %; and the polymer powder described above where the aliphatic component is bio-based.

A polymer powder composition particularly adapted for use in laser sintering is also described including a first aliphatic nylon copolymerized with a second aliphatic nylon, and additionally containing unreacted cyclic monomer.

Additional embodiments include: the polymer powder composition described above where the unreacted cyclic monomer comprises caprolactam or laurolactam; the polymer powder composition described above where the first aliphatic nylon comprises nylon 6, and/or nylon 12; the polymer powder composition described above where the first aliphatic nylon comprises nylon 6 and the unreacted cyclic monomer comprises caprolactam; the polymer powder composition described above where the second aliphatic nylon comprises nylon 66 and/or nylon 69; the polymer powder composition described above where the unreacted cyclic monomer is present in an amount of about 3 mole % to about 9 mole %; the polymer powder composition described above where the unreacted cyclic monomer is present in an amount of about 4 mole % to about 7 mole %; the polymer powder composition described above where the unreacted cyclic monomer is present in an amount of about 6 mole % to about 7 mole %; the polymer powder composition described above where the first aliphatic nylon is present in an amount of about 70 mole % to about 90 mole % and the second aliphatic nylon is present in an amount of about 10 mole % to about 30 mole %; and the polymer powder compositions described above additionally containing a heat stabilizer comprising copper halide and/or phosphorous antioxidant.

A method of making a 3D laser sintered part using the above powder compositions is also described.

BRIEF DESCRIPTION OF THE DRAWINGS

The FIGURE depicts representative thermal characteristics of powders described herein.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Polymer powder compositions containing nylon copolymers with enhanced laser sintering properties and advantages over and above such things as the nylon 12 and nylon 11 powders commonly used in the industry are described herein. For example, among other things, the ability to compound additives and antioxidants into these materials allows for additional customization of these powders. As mentioned above, one of the problems with most polymers in this industry is the lack of an operating temperature window between melt point onset and crystallization onset for them to be usable in this laser sintering environment. Choice of the powders described herein provides an alternative to such things as the commonly used nylon 12 and nylon 11 powders in this laser sintering environment, with added benefits.

The laser sintering process is one of the few 3D printing processes that can generate products with acceptable mechanical strength and chemical resistance for true commercial applications. Such processes generate the parts in thin layers, e.g., 100 microns thick at a time, with many scans, e.g., over 1000 scans not being uncommon, melting and fusing the polymer powder layer-by-layer. The process has many benefits over conventional processing, e.g., injection molding, since there is no need to generate a costly mold, which can also make even minor modifications possible only with significant added cost. It also allows for part customization on a customer to customer basis, again without having to produce costly molds for each customization. In addition, 3D printing machines have now become relatively inexpensive. And while some machines use liquid polymers, and some use fibers, the more commercial machines tend to favor laser sintering and powder material. As mentioned above, the temperature profiles of such polymer materials are critical in this environment. And while powder particle shape and size can be important depending on the specific equipment being used, processing the polymer into powder is conventional and well known, such as by polymer precipitation and conventional grinding and cryo-grinding. The polymer powder described herein has all of the properties required for use in this environment, and in addition has an enhanced temperature profile for advantageous processing in this environment.

In a typical laser sintering apparatus, the powder is preheated to a temperature just below its melting point, and layered across a surface, e.g., with a roller (so clearly polymer powder heat stability is important). The layer is then hit with a laser to melt a portion of the layer to match 3D CAD (computer aided design) data supplied to the equipment. A section of the platform supporting the polymer layer is then dropped by the thickness of the layer, another layer of polymer applied across the platform, and the process repeated, layer by layer. As can be appreciated, there is a significant amount of unmelted polymer powder remaining after the process is completed, so it is advantageous for the unmelted powder involved in the process to be able to be reused and recycled for subsequent laser sintering processing. The powder material described herein not only has enhanced heat stability but advantageous recyclability for reuse as well upon stabilization.

As mentioned above, it is important for the parts products by this process (tools, medical devices, sculpture, etc.) to have chemical and mechanical properties useful for their intended purpose. It is particularly advantageous the closer the properties of the parts produced can come to comparable parts produced by an injection molded process. The polymer powders described herein are particularly noteworthy in that regard. For example, using a conventional laser sintering powder typically results in a part with only a 30% to 40% strength profile as compared to a comparable injection molded part (for example, in the z direction in a three dimensional x-y-z part strength profile graph). With the parts produced using the laser sintering powder described herein, parts are produced with at least equal or superior strength profile as conventional nylon 12 laser sintered parts in all three directions.

An additional benefit of the powders described herein, is their ability to allow for customization. For example, in addition to the ability for color customization, other additives such as conventional copper halides and phosphorous antioxidants can be added to the powders to extend recycling properties, without adversely impacting their other properties required for laser sintering, including their enhanced thermal profile.

As mentioned above, heat stability is very important for the polymer powder in this environment. The powder is heated up to a temperature just below the melting onset and held there for a significant period of time, e.g., for as long as 12 hours. It is critical that the polymer not change in its physical or chemical state during that time, until exposed to the laser. This includes powder particles not sticking to one another, or transferring heat out across or down the particle. In this regard, the powder described herein has an enhanced temperature profile which clearly exceeds that of conventional laser sintering powders. This is demonstrated, for example, with reference to the FIGURE, discussed below.

As can be appreciated by the above, the thermal properties of the polymer powders used in this environment are critical. While liquid 3D printing applications can use thermosetting resins, the laser sintering processes typically use thermoplastic powders. And the thermal properties of these polymers are key. Melt points and crystallization points are typically measured for these polymers with DSC (differential scanning calorimeter) measurements. For successful 3D processing, typically at the target temperatures of about 155° C. to about 175° C. it is desired to have no changes taking place in the powder, i.e., not only should the heating and cooling curves not overlap in these areas, but the temperature curves should remain flat in these area as well, i.e., a "dead zone". The polymer powder described herein extends this area of thermal stability over and above that attainable with conventional nylon 12 and nylon 11 powder commonly used in this area. See also *Annals of DAAAM for* 2010 & *Proceedings of the 21st International DAAAM Symposium*, Vol. 21, No. 1, ISSN 1726-9679 ISBN 978-3-901509-73-5, Editor B. Katalinic, published by DAAAM International, Vienna, Austria, EU, 2010; and *Consolidation of Polymer Powder by Selective Laser Sintering*, by Kruth et al, 3rd International Conference PMI2008. (2008). Ghent, Belgium. pp. 1-16, the disclosures of which are herein incorporated by reference.

This is further demonstrated with reference to the FIGURE. Both the solid line (A) and broken line (B) curves show crystallization and melting onsets for the polymers described herein on a DSC operated at a heating/cooling rate of 2° C. per minute. In the FIGURE, the solid line indicates a powder copolymer containing nylon 612 in an amount of about 80 mole % isophthalic acid in an amount of about 2 mole %, and terephthalic acid in an amount of about 18 mole %. The broken line shows a conventional, commercially available nylon 12 nylon powder polymer. As can be seen in the FIGURE, for the conventional material (B) the dead space where there is no melting or crystallization activity taking place in the polymer ($B_1$ to $B_2$=6.39° C.) is significantly less than the range for the polymer material described herein ($A_1$ to $A_2$=10.11° C.). The broader this temperature window, the more desirable the material is for laser sintering, for example, providing the opportunity to include additional additives while still maintaining the window needed, the production of stronger mechanical properties and smoother parts, the use of thicker layers of powder at each pass, provide more flexibility for acceptable part production even with machine variability during operation, a more user friendly operating window, etc.

As described herein, it has been found that this broader window can be generated by modification of selective nylons by copolymerization, and in some cases, including the presence of some unreacted cyclic monomer.

In the copolymer embodiment, the isophthalic and terephthalic acids are actually reacted into the nylon 612 polymer (the same enhanced results were not attained with the inclusion of only one of the acids alone).

All embodiments result in a broader window for laser sintering and comparable or stronger mechanical properties, especially demonstrated in the z direction, as discussed above. It is also important that these properties not change over time.

It has also been found that various materials can be added to the polymers described herein (unlike conventional laser sintering materials), without significant detriment to the enhanced temperature profile window. In fact, the addition of such things as conventional heat stabilizers, for example, copper halides (e.g., iodide) and phosphorous antioxidants, can actually broaden this enhanced window, enhance the strength of the finished product as described, especially noteworthy in the Z direction, and extend the recycle life of the powder.

With conventional powders, such as nylon 12 for example, if the powders are produced through precipitating processing, this would naturally limit the inclusion of additives. With nylon 11, since it already has a narrow temperature profile window, the use of additives could adversely narrow this already narrow window even further. With the powders described herein, the material has the capability for virtually any additive because of broadened temperature profile window, again, which allows for inclusion of additives and fillers which would otherwise not be available for inclusion.

The Table below further demonstrates the enhanced properties of the materials described herein. Samples 1 and 2 are nylon 12 and nylon 11 commercial products currently used in laser sintering processes. Samples 3 and 4 are nylon 612 and nylon 610 copolymerized with HMD (hexamethylene diamine) modified terephthalic and isophthalic acids. Samples 5 is a nylon 6 copolymer with nylon 69, additionally containing unreacted caprolactam. Samples 6 and 7 are nylon 6 copolymers with nylon 66. And samples 8 and 9 are nylon 6 copolymers with HMD (hexamethylene diamine) modified terephthalic and isophthalic acids. The copolymers are prepared by conventional polymerization methods as described further below.

As described above, one example of the laser sintering polymer powder described herein comprises nylon copolymers containing at least one aromatic component and at least one aliphatic component. The aliphatic components typically comprise $C_4$ to $C_{12}$ diamines (such as hexamethylene diamine) reacted with $C_4$ to $C_{18}$ diacids (such as sebacic acid) (for example, nylon 11, 12, 610, 611, 612, 618, 10/10, 10/12, 12/12, etc.). The aromatic components typically comprise one or more phthalic acids, diphenic acids, and/or aromatic diamines. The phthalic acid typically comprises isophthalic acid and/or terephthalic acid. The aromatic diamine typically comprises xylenediamine and/or phenylene diamine.

The aliphatic component is typically present in an amount of about 75 mole % to about 95 mole % and the aromatic component is typically present in an amount of about 5 mole % to about 25 mole %, for example, an aliphatic nylon 612 component of about 75 mole % to about 90 mole %, and an aromatic component comprising isophthalic acid present in an amount of about 0.5 mole % to about 4.5 mole % and terephthalic acid present in an amount of about 9 mole % to about 22 mole %. A representative polymer powder comprises nylon 612 present in an amount of about 80 mole %, and the isophthalic acid is present in an amount of about 2 mole % and terephthalic acid present in an amount of about 18 mole %. Another representative polymer powder includes an aliphatic component comprising nylon 610 present in an amount of about 75 mole % to about 90 mole %, and an aromatic component comprising isophthalic acid present in an amount of about 0.5 mole % to about 4.5 mole % and terephthalic acid present in an amount of about 9 mole % to about 22 mole %. A representative polymer powder also includes a nylon 610 present in an amount of about 80 mole %, and isophthalic acid present in an amount of about 2 mole % and terephthalic acid present in an amount of about 18 mole %.

Another representative polymer powder composition includes an aliphatic nylon component comprising nylon 6 present in an amount of about 80 mole % to about 95 mole %, and an aromatic component comprising isophthalic acid present in an amount of about 0.5 mole % to about 4.5 mole % and terephthalic acid present in an amount of about 4 mole % to about 19 mole %, for example, where the nylon 6 is present in an amount of about 85 mole %, and the isophthalic acid is present in an amount of about 1.5 mole % and terephthalic acid present in an amount of about 13.5 mole %. All of the aliphatic components can also be bio-based (i.e., non-petroleum or vegetable based).

Another polymer powder composition particularly adapted for use in laser sintering described herein comprises a first aliphatic nylon copolymerized with a second aliphatic nylon, and additionally containing unreacted cyclic monomer. The first aliphatic nylon can comprise nylon 6 and/or nylon 12, for example. The second aliphatic nylon can comprise nylon 66 and/or nylon 69, for example. The unreacted cyclic monomer, e.g., caprolactam or laurolactam, is typically present in an amount of about 3 mole % to about 9 mole %, more typically present in an amount of about 4 mole % to about 7 mole %, and generally present in an amount of about 6 mole % to about 7 mole %. The first aliphatic nylon is typically present in an amount of about 70 mole % to about 90 mole % and the second aliphatic nylon is typically present in an amount of about 10 mole % to about 30 mole %. The polymer powder described herein can also additionally containing a heat stabilizer comprising copper halide and/or phosphorous antioxidant.

TABLE

| | | | | Relative Weight % of Raw Material as Added to the Reactor | | | | | | | | | |
|---|---|---|---|---|---|---|---|---|---|---|---|---|---|
| No | Polymer Sample | Mole % | HMD | Dodecanedioic Acid | Sebacic Acid | Terephthalic Acid | Isophthalic Acid | Azelaic Acid | Adipic Acid | Caprolactam | Tm Peak ° C. | Tc Peak ° C. | ΔT ° C. |
| 1 | Nylon 12 | 100 | | | | | | | | | 140 | 189 | 49 |
| 2 | Nylon 11 | 100 | | | | | | | | | 150 | 204 | 54 |
| 3 | Nylon 612 copolymer with HMD-terephthalic acid and HMD-isophthalic acid | 80/18/2 | 34.8 | 55.2 | | 9.0 | 1.0 | | | | 144 | 196 | 52 |
| 4 | Nylon 610 copolymer with HMD-terephthalic acid and HMD isophthalic acid | 80/18/2 | 37.3 | | 52.0 | 9.6 | 1.1 | | | | 146 | 204 | 58 |
| 5 | Nylon 6/Nylon 69 copolymer + unreacted caprolactam | 90/10 | 8.8 | | | | | 14.2 | | 77.0 | 135 | 196 | 61 |
| 6 | Nylon 6/Nylon 66 copolymer + unreacted caprolactam | 70/30 | 22.1 | | | | | | 27.8 | 50.1 | 117 | 177 | 60 |
| 7 | Nylon 6/Nylon 66 copolymer + unreacted caprolactam | 90/10 | 9.1 | | | | | | 11.4 | 79.5 | 120 | 182 | 62 |
| 8 | Nylon 6 copolymer with HMD-terephthalic acid and HMD-isophthalic acid | 90/9/1 | 8.9 | | | 11.5 | 1.3 | | | 78.3 | 116 | 177 | 61 |
| 9 | Nylon 6 copolymer with HMD-terephthalic acid and HMD-isophthalic acid | 85/13.5/1.5 | 12.6 | | | 16.2 | 1.8 | | | 69.4 | 62* | 165 | — |

*= Tg; not observed at 20° C./minute rate; Tm observed at slower temperature ramp rates The copolymers described herein are made by conventional copolymerization techniques, as represented by the Example below.

EXAMPLE

The following is a representative preparation of a copolymer of nylon 612, nylon 6I (HMD and isophthalic acid) and nylon 6T (HMD and terephtalic acid). The process yields 1780 grams (g) of copolymer resin. In 1875 g of water, add 992 g of HMD, 1100 g of DDDA (dodecanedioic acid), 180.3 g of terephthalic acid and 20 g of isophthalic acid. Heat the mixture at 75° C. under a nitrogen blanket with continuous stirring till all DDDA dissolves. Adjust the pH to 7.7 (apparent pH of 5% salt solution) by adding HMD or DDDA. Add 1 g of antifoam solution. Reactor vessel (Parr Instrument Company) is a 2 gallon, high pressure, agitated reactor. Purge the reactor vessel with nitrogen for 20 minutes. Seal the reactor vessel and heat to 150 psi (pounds per square inch). Hold the pressure to 150 psi until the mixture reaches 230° C. Then depressurize the reactor vessel at 2.5 psi/minute to 20 psi. Then begin a 30 psi nitrogen purge until the temperature reaches 252° C. At this point most of the water is removed from the reactor vessel. Start building vacuum slowly and continue pulling vacuum until the desired viscosity of 0.8 amps at 90 rpm (revolutions per minute) as measured by agitator torque is reached. Pressurize the reactor vessel with nitrogen, open the valve at the bottom of the reactor vessel. The bottom of the reactor vessel contains a die with holes which results in strands. The strands are cooled in a quench trough containing room temperature water. Strands are fed into a pelletizer to yield copolymer pellets. The pellets can be ground or precipitated using conventional techniques used to form laser sinter powder.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What we claim is:

1. A polymer powder composition particularly adapted for use in laser sintering comprising a heat stabilizer and a nylon copolymer containing at least one aromatic component and at least one aliphatic component,
   wherein the aliphatic component comprises nylon 612 present in an amount of about 75 mole % to about 95 mole %, and
   wherein the at least one aromatic component comprises one or more phthalic acid present in an amount of about 5 mole % to about 25 mole %.

2. The polymer powder composition of claim 1, wherein the polymer powder composition is obtained by grinding polymer pellets.

3. The polymer powder composition of claim 1, wherein the nylon copolymer exhibits a difference between melting temperature and crystallization temperature of 52° C.

4. The polymer powder of composition claim 1, wherein the aliphatic component is bio-based.

5. The polymer powder composition of claim 1, wherein the heat stabilizer comprises copper halide and/or phosphorous antioxidant.

6. The polymer powder composition of claim 1 wherein the phthalic acid comprises isophthalic acid and/or terephthalic acid.

7. The polymer powder composition of claim 1, wherein the aromatic component comprises isophthalic acid present in an amount of about 0.5 mole % to about 4.5 mole % and terephthalic acid present in an amount of about 9 mole % to about 22 mole %.

8. The polymer powder composition of claim 7, wherein the nylon 612 is present in an amount of about 80 mole %, and the isophthalic acid is present in an amount of about 2 mole % and terephthalic acid present in an amount of about 18 mole %.

9. A method of making a 3D laser sintered part using the polymer powder composition of claim 1.

10. A polymer powder composition particularly adapted for use in laser sintering comprising a heat stabilizer and a nylon copolymer containing at least one aromatic component and at least one aliphatic component,
    wherein the aliphatic component comprises nylon 610 present in an amount of about 75 mole % to about 95 mole %, and
    wherein the at least one aromatic component comprises one or more phthalic acid present in an amount of about 5 mole % to about 25 mole %.

11. The polymer powder composition of claim 10, wherein the nylon copolymer exhibits a difference between melting temperature and crystallization temperature of 58° C.

* * * * *